(12) United States Patent
Liesegang et al.

(10) Patent No.: US 8,318,069 B2
(45) Date of Patent: Nov. 27, 2012

(54) METHOD FOR SECURING A MACHINE ELEMENT

(75) Inventors: Hans-Jürgen Liesegang, Schortens (DE); Mathias Seuberling, Bad Königshofen (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 12/840,124

(22) Filed: Jul. 20, 2010

(65) Prior Publication Data

US 2011/0162174 A1 Jul. 7, 2011

(30) Foreign Application Priority Data

Jul. 21, 2009 (DE) .................. 10 2009 034 012

(51) Int. Cl.
*B29C 45/14* (2006.01)
(52) U.S. Cl. .................. 264/263; 249/83
(58) Field of Classification Search .................. None
See application file for complete search history.

(56) References Cited

U.S. PATENT DOCUMENTS

| 3,626,506 A | | 12/1971 | Spieth | |
|---|---|---|---|---|
| 4,643,041 A | * | 2/1987 | Benton | 74/441 |
| 5,778,571 A | * | 7/1998 | Pasqualini et al. | 37/455 |
| 6,564,666 B1 | * | 5/2003 | Marcel | 74/425 |
| 6,843,148 B2 | * | 1/2005 | Marcel | 74/425 |
| 8,048,357 B2 | * | 11/2011 | Barefield et al. | 264/261 |

FOREIGN PATENT DOCUMENTS

| DE | 1711030 U | 11/1955 |
|---|---|---|
| DE | 1983834 U | 4/1968 |
| DE | 1625452 A1 | 1/1970 |
| DE | 10246825 A1 | 4/2004 |
| DE | 10249275 A1 | 5/2004 |
| EP | 0878271 A2 | 11/1998 |
| EP | 1408248 A2 | 4/2004 |

* cited by examiner

*Primary Examiner* — Edmund H. Lee
(74) *Attorney, Agent, or Firm* — Mark A. Ussai; Bryan Peckjian

(57) ABSTRACT

A method is disclosed in which a pressurized fluid presses an axial abutment surface against a first machine element in the axial direction to thereby fix the axial position of the first machine element and/or to thereby set a desired axial pre-loading of the first machine element. The fluid is then solidified to permanently maintain the axial position and/or the axial pre-loading of the first machine element. A clamp is disclosed that permanently affixes the first machine element relative to a second machine element using this method. An apparatus comprising the first machine element axially fixed relative to the second machine element by the clamp is also disclosed.

13 Claims, 2 Drawing Sheets

METHOD FOR SECURING A MACHINE ELEMENT

CROSS-REFERENCE

This application claims priority to German patent application no. 10 2009 034 012.2, filed on Jul. 21, 2009, which is incorporated fully herein by reference.

TECHNICAL FIELD

The present invention generally relates to methods and devices for securing or affixing a machine element, e.g., in its axial direction. In addition, assemblies are taught that include a machine element secured or affixed according the present teachings.

BACKGROUND

Various methods are known in the art for securing or fixing the axial position and/or the amount of axial pre-loading of a machine element disposed, e.g., on a shaft or in a bore, so that the actual axial position and/or the actual axial pre-loading of the machine element does not unacceptably deviate from a desired axial position and/or a desired axial pre-loading. For example, an abutment device can be fixedly disposed adjacent to one axial side of the machine element and an abutment surface of the abutment device may be positioned so as to axially abut against the machine element, thereby preventing a change of the position of the machine element in an axial direction. In addition, if the abutment surface is forcibly pressed against the machine element along its axial direction such that a shifting or displacement of the machine element in the axial direction is prevented, a pre-loading or biasing or tensioning of the machine element in the axial direction can be produced.

For small machine elements having dimensions in the range of a few centimeters, the axial securing operation is normally performed during an automated mounting process that utilizes standard components. However, for very large machine elements, the absolute tolerances, in particular the tolerances of the installation space, can be relatively large values, such that an individualized alignment or adjustment may be necessary to axially secure or fix the machine element with defined properties, e.g., with a pre-defined axial pre-loading.

To overcome this tolerance problem, it is known, e.g., to fix a large bearing on a shaft by providing an axial support between a shaft shoulder and a clamping ring. A custom-made spacer ring is then disposed between the large bearing and the clamping ring in the axial direction in order to precisely compensate for the tolerances. However, if a customized production of the spacer ring is required or the selection of a suitable spacer ring from an assortment of spacer rings is necessary to precisely compensate the tolerances, significant additional expenses and/or labor requirements will incurred during the assembly process.

Such a tolerance compensating method can be used, e.g., when mounting a bearing of a rotor shaft in a wind turbine. In this case, the rotor shaft bearing abuts against a shaft shoulder on one axial side and is secured or fixed by a clamping ring on the other axial side. In addition, the clamping ring axially abuts against a further shaft shoulder or an axial end surface of the shaft and is screwed together with the shaft. Even though this approach leads to usable results, there is a need for alternative solutions due to the relatively large expense incurred during the mounting process.

In principle, it is also possible to press a clamping ring having a relatively long radial clamping surface onto the shaft and then to axially displace or slide the clamping ring until it has reached its intended position. This axial displacement step can be performed, e.g., by using a hydraulic nut, with which both the necessary force and the necessary precision can be achieved. The use of a hydraulic nut for mounting a ring body on a shaft and for removing the ring body from the shaft is known, e.g., from EP 0 878 271 A2. This hydraulic nut includes an annular piston that is disposed in an annular groove and forms a pressure chamber with the groove. In order to axially displace or shift the ring body, the pressure chamber is filled with pressurized hydraulic fluid, which pushes the piston outwardly.

However, the relatively long radial clamping surface necessary for achieving a reliable securing of the machine element without using screws leads to the possibility that relatively strong forces could develop. Consequently, there is a risk of damaging the shaft and/or the clamping ring when using such a mounting process.

SUMMARY

In one aspect of the present teachings, methods and devices are taught that are capable of achieving a reliable axial securing or fixing of a machine element with well defined properties.

In another aspect of the present teachings, a method for securing or fixing a machine element in an axial direction is taught. For example, in such a method, pressurized fluid may be used to press an axial abutment surface in the axial direction against the machine element, thereby securing or fixing the machine element in a desired axial position and/or thereby setting a desired axial pre-loading of the machine element, i.e. a biasing or tensioning of the machine element in the axial direction. The axial abutment surface is then permanently fixed in its axial position by solidifying the fluid, thereby preserving or maintaining the set axial position and/or the set axial pre-loading of the machine element.

In this aspect of the present teachings, a reliable axial securing of a machine element is possible with a relatively low expense and/or labor requirement. In addition or in the alternative, the properties of the axial securing may be precisely set. For example, a desired axial pre-loading of the machine element can be precisely set by appropriately selecting the amount of the pressure, to which the fluid is subjected.

In another aspect of the present teachings, a machine element can be axially fixed on a shaft or in a bore. For example, the machine element can be a ring of a bearing, e.g., a ring of a roller bearing.

In another aspect of the present teachings, the axial abutment surface can move or axially-displace during the step of pressing the abutment surface against the machine element, which allows for the compensation or balancing of size tolerances of one or more of the machine elements to be secured. Such an axial movement or displacement is advantageous, because relatively large size tolerances can be compensated with no additional expense or labor requirements. This may entirely eliminate the need for a costly alignment/adjustment procedure and/or an individualized selection or production of tolerance-compensating components (e.g., spacer washers). Also, it is not even required to know or to ascertain the size variances that are present, thereby further simplifying the assembly process.

In another aspect of the present teachings, the axial abutment surface can be pressed against the machine element using an axially-displaceable piston of a clamping device. For example, the axial abutment surface can be a part of the piston.

In another aspect of the present teachings, the fluid can be supplied into a hollow chamber of the clamping device, which hollow chamber is closed or sealed by the piston. In this case, the pressurized fluid will urge the piston outwardly relative to the hollow chamber and into abutment and/or pressurized contact (e.g., a pre-loaded state) with the machine element to be fixed or secured in the axial direction. Such a method is advantageous because it can be reliably performed with relatively simple components.

In another aspect of the present teachings, the clamping device is preferably fixed in the axial direction prior to applying the pressurized fluid to the machine element. In this case, it can be ensured that the pressure in the fluid is converted exclusively into an axial displacement movement of the piston and a desired contact pressure can be applied to the machine element via the piston. In a preferred embodiment, the clamping device can be fixed or secured to a shaft or to a component that is rigidly fixed relative to a bore. The clamping device can be axially fixed or secured, e.g., by using one or more attachment screws or by using an inner thread or an outer thread of the clamping device.

In another aspect of the present teachings, the fluid is preferably caused to solidify, e.g., by a chemical reaction, more preferably by a polymerization reaction.

In another aspect of the present teachings, a clamping device is taught that is capable of axially securing or fixing a machine element. Such a clamping device may include, e.g., a piston and an axial abutment surface that is axially shiftable or displaceable by the piston. The axial abutment surface is preferably designed or configured to abut on or against the machine element in the axial direction. The piston is fixable or securable in the axial direction by a solidified fluid.

For example, the piston may be designed or configured to close or seal a hollow chamber that is filled with the solidified fluid. The hollow chamber can be also formed as a pressure chamber. Such an embodiment has the advantage that a relatively high pre-loading of the machine element can be generated by the clamping device.

The hollow chamber may be accessed via at least one inflow opening, through which the pressurized fluid is supplied into the hollow chamber before the solidification step.

The axial abutment surface may be formed on the piston. The piston may have an annular or ring shape, or a substantially annular or ring shape, which enables a relatively compact construction of the clamping device. Further, the piston may be segmented (e.g., a plurality of pistons may be provided) or the piston may be continuous or endless in the circumferential direction.

In another aspect of the present teachings, the machine element may be disposed on a shaft. In addition or in the alternative, the machine element may be formed as a bearing ring, e.g., as a ring of a roller bearing, such as e.g., a two-row tapered roller bearing.

Clamping devices according to the present teachings find advantageous application as a component of a wind turbine. In such an embodiment, the shaft may be formed as a rotor shaft of a wind turbine. Since machine elements, such as e.g., bearing rings, having a relatively large diameter (e.g. three feet or more) must be axially fixed in a wind turbine, the use of the present clamping devices is especially advantageous for compensating relatively large tolerances inherent to such large devices in a cost- and labor-efficient manner.

In another aspect of the present teachings, assemblies are taught that include a machine element and one or more clamping devices according to the present teachings Further advantages, features, objects and embodiments of the invention will be readily derivable from the exemplary embodiments described in the following in conjunction with the appended Figures.

DETAILED DESCRIPTION OF THE PREFERRED EMBODIMENTS

Each of the additional features and teachings disclosed below may be utilized separately or in conjunction with other features and teachings to provide improved clamps, apparatus, bearings and/or bearing assemblies, as well as methods for designing, constructing and using the same. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
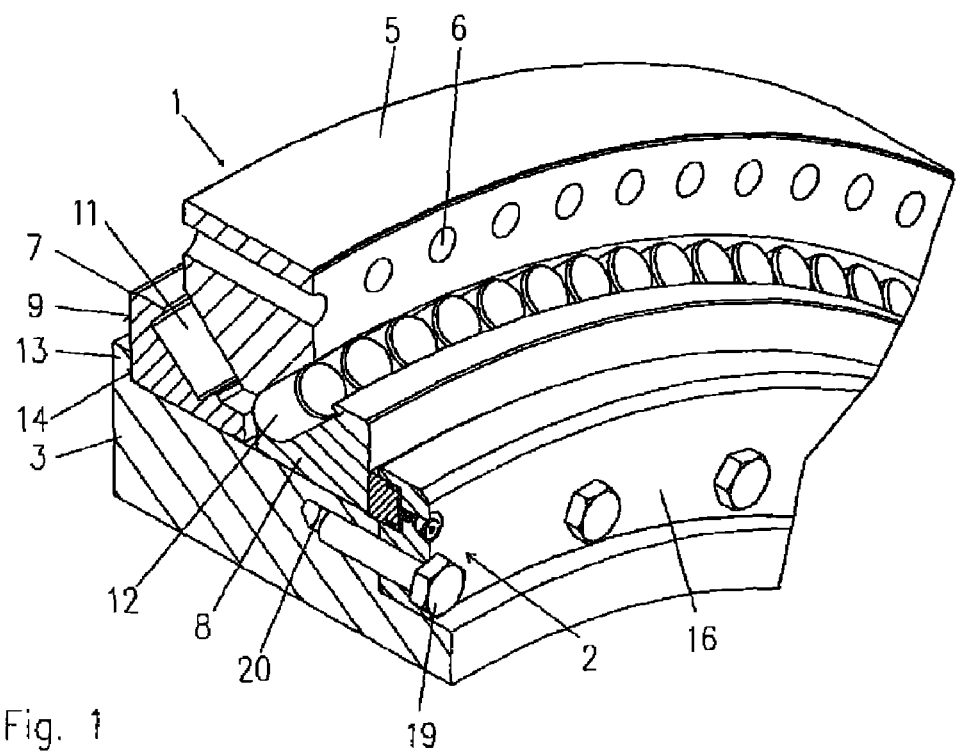
FIG. 1 shows a perspective illustration of a first exemplary embodiment of a bearing assembly.
Figure 2:
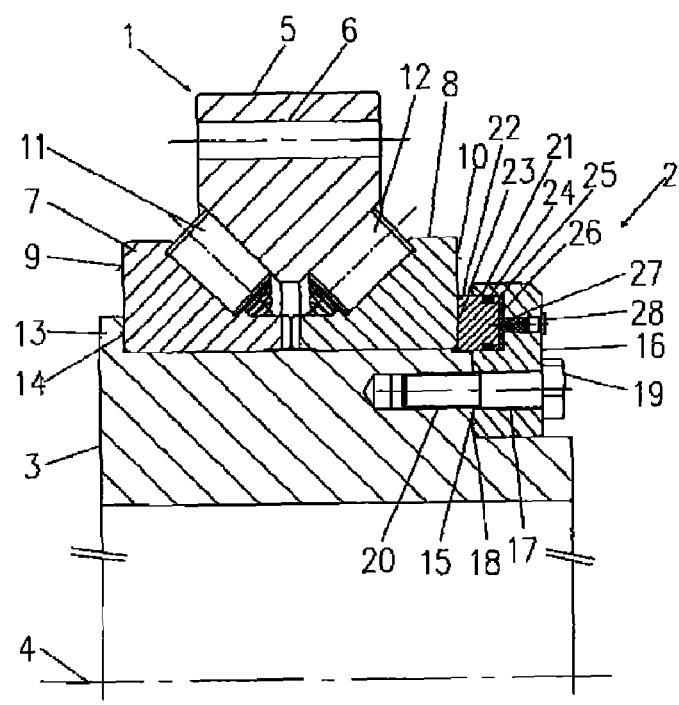
FIG. 2 shows a cross-sectional illustration of the exemplary embodiment of FIG. 1.

FIG. 1 shows a perspective illustration of the first exemplary embodiment of a bearing assembly according to the present teachings. FIG. 2 shows an axial cross-sectional illustration thereof.

The bearing assembly includes a two-row tapered roller bearing 1 and a clamping device 2 that axially secures or fixes the tapered roller bearing 1 and is fixed on a shaft 3. The shaft 3 can be formed e.g., as a rotor shaft that is driven by a rotor of a not-illustrated wind turbine.

The tapered roller bearing 1 has a rotational axis 4 that is also simultaneously an axis of the clamping device 2 and an axis of the shaft 3 in the illustrated mounted state. In a disassembled state, the rotational axis 4 of the tapered roller bearing 1, the axis of the clamping device 2 and the axis of the shaft 3 can differ from one another. Unless otherwise described in the following, directional indications refer in each case to the rotational axis 4 of the tapered roller bearing 1 and the axis of the clamping device 2 or the axis of the shaft 3, respectively. Therefore, an axial direction given for the tapered roller bearing 1 or one of its components is a direction parallel to the rotational axis 4 of the tapered roller bearing 1. For the clamping device 2 and the shaft 3, the axial direction is in each case a direction parallel to the axis of the clamping device 2 and the shaft 3, respectively. The radial direction is the direction perpendicular to the rotational axis 4 of the tapered roller bearing 1 and/or to the axis of the clamping device 2 or the shaft 3.

The tapered roller bearing 1 includes an outer ring 5 having two conical tracks that are disposed side by side in the axial direction. Together, the two conical tracks form a V-shaped profile. In certain embodiments of the present teachings, the outer ring 5 may have an outer diameter of one meter or more. One or more axial bores 6 are preferably provided for attaching the outer ring 5 to a not-illustrated housing or other support structure, e.g., via screw or bolts.

The tapered roller bearing 1 also includes two inner rings 7, 8, arranged axially side by side, and each having a conical track. The inner ring 7 has an outer axial end surface 9 and the inner ring 8 has an outer axial end surface 10. The outer ring 5 and the two inner rings 7, 8 are formed as circumferentially-enclosed rings in the illustrated exemplary embodiment, i.e. as annular structures that extend continuously or endlessly in the circumferential direction. However, segmented rings also may be utilized with the present teachings.

Conically-formed roller bodies 11 roll on the track of the inner ring 7 and on the adjacent track of the outer ring 5. Conically-shaped roller bodies 12 roll on the track of the inner ring 8 and on the adjacent track of the outer ring 5. In the illustration of FIGS. 1 and 2, the tapered roller bearing 1 is constructed without bearing cages for the roller bodies. However, the present teachings are not limited in this regard and it is also possible to provide one or more cages for the roller bodies 11, 12. In such an embodiment, the cage(s) may be segmented or circumferentially-enclosed (extending continuously in the circumferential direction). For example, the cage may comprise a plurality of cage segments made of plastic, which can be disposed one after another in the circumferential direction, as is disclosed in DE 102 46 825 A1, which is incorporated fully herein by reference.

The two rings 7, 8 are disposed on the shaft 3 and are connected with the shaft 3 so that they rotate together. For this purpose, the shaft 3 includes a shoulder 13 having an axial abutment surface 14. An outer axial end surface 9 of the inner ring 7 axially abuts on the axial abutment surface 14. In addition, the shaft 3 also has an axial abutment surface 15 on its axial end opposite to the shoulder 13.

The clamping device 2 includes a clamping ring 16 with one or more axial bores 17 and an axial abutment surface 18 adjacent to the axial bores 17. The axial abutment surface 18 is configured to abut against the axial abutment surface 15 of the shaft 3. The clamping ring 16 is fixedly screwed together with the shaft 3 using the attachment screws 19, which are inserted through the axial bores 17 of the clamping ring 16 and engage in the axial thread bores 20 of the shaft 3.

An annular-extending axial groove 21 is defined in or on the radially-extending side of the clamping ring 16 that faces the inner ring 8. The axial groove 21 is closed or sealed by an annular piston 22 that has an axial abutment surface 23 projecting or protruding from the axial groove 21. The axial abutment surface 23 is configured or designed to abut on the outer axial end surface 10 of the inner ring 8. Inner and outer sealing rings 24 respectively contact the radially-inner and -outer side walls of the axial groove 21 in a sealing manner, thereby defining a sealed hollow chamber 25 between the piston 22 and the base of the axial groove 21.

In the illustration of FIGS. 1 and 2, the hollow chamber 25 is filled with a solidified fluid 26 that fixes the position of the piston 22 in the axial direction relative to the clamping ring 16. The interior of the hollow chamber 25 is accessible through an axially-extending inflow opening 27 that is sealed by a sealing screw 28 after the fluid 26 has filled the hollow chamber 25.

Since the clamping ring 16 is fixedly screwed together with the shaft 3, the inner rings 7, 8 of the tapered roller bearing 1 are axially clamped between the axial abutment surface 14 of the shoulder 13 and the axial abutment surface 23 of the piston 22. Due to this clamping, an axial force is applied to the inner ring 8 and is also applied to the inner ring 7 via the roller bodies 11, 12 and the outer ring 5. Since the inner ring 7 abuts on the axial abutment surface 14 of the shoulder 13, a corresponding axial counterforce is present. Thus, the tapered roller bearing 1 is axially pre-loaded; more specifically, the inner rings 7, 8 are pre-loaded, biased or tensioned in the axial direction. In addition, the inner rings 7, 8 are axially fixed on the shaft 3 so that they rotate together.

A representative method for mounting the tapered roller bearing 1 on the shaft 3 will now be described.

First, the tapered roller bearing 1 is pushed in the axial direction onto the shaft 3 from the side that is axially opposite to the shoulder 13 until the outer axial end surface 9 of the inner ring 7 of the tapered roller bearing 1 contacts the axial abutment surface 14 of the shoulder 13 of the shaft 3. Depending upon whether a radial clamping surface is present between the shaft 3 and the inner rings 7, 8 of the tapered roller bearing 1, it may be necessary to press the tapered roller bearing 1 onto the shaft 3 by heating the inner rings 7, 8 in order to expand the inner rings 7, 8 and/or by cooling the shaft 3 to contract the shaft 3.

When the tapered roller bearing 1 has reached its axial end position on the shaft 3, the clamping device 2 is axially pushed onto the shaft 3 from the same side as the tapered roller bearing 1, e.g., until the axial abutment surface 18 of the clamping ring 16 of the clamping device 2 contacts the axial abutment surface 15 of the shaft 3.

Figure 3:
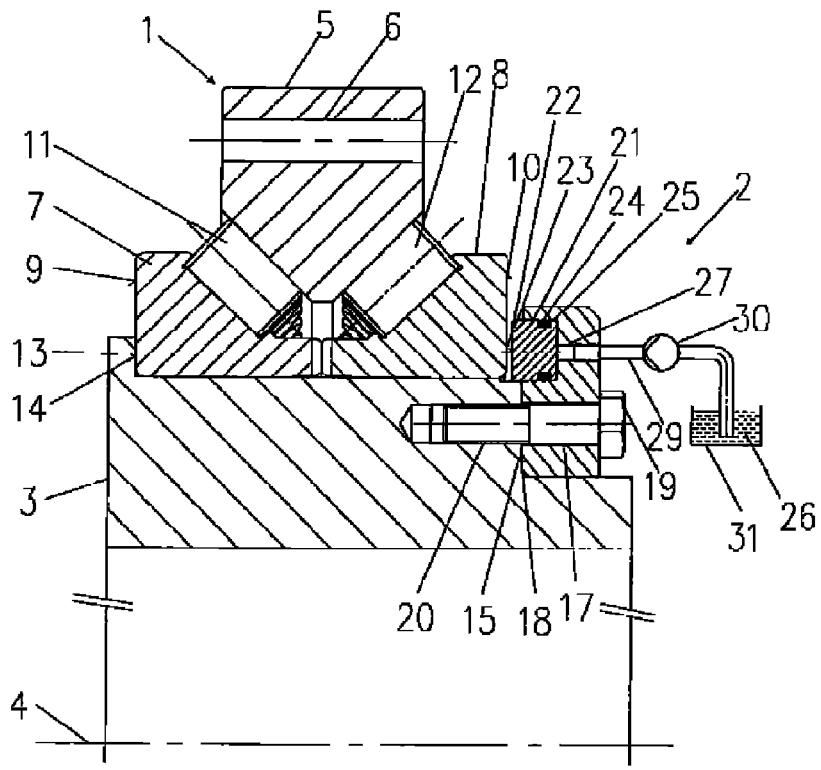
FIG. 3 shows a cross-sectional illustration of the exemplary embodiment of FIG. 1 during the mounting or assembly process.

FIG. 3 shows a cross-sectional illustration of the exemplary embodiment of in FIG. 1 in this state.

At the point of time illustrated in FIG. 3, the hollow chamber 25 of the clamping device 2 is not yet filled with the fluid 26 and the axial abutment surface 23 of the piston 22 does not yet abut on the outer axial end surface 10 of the inner ring 8. However, depending on the tolerances of the tapered roller bearing 1, the shaft 3 and the clamping device 2, as well as depending upon the initial position of the piston 22, it is possible that the axial abutment surface 23 of the piston 22 will already contact the outer axial end surface 10 of the inner ring 8 in this initial state, i.e. when the clamping device 2 is initially mounted on the shaft 3. However, whether or not the axial abutment surface 23 contacts the outer axial end surface 10 at this time has no effect on the subsequent mounting procedure, because the piston 22 is axially shiftable or displaceable as long as the hollow chamber 25 of the clamping device 2 is not yet filled with the solidified fluid 26. In other words, due to the axial shiftability of the piston 22, axial size tolerances of the tapered roller bearing 1, the shaft 3 and the clamping device 2 can be compensated by axially displacing the piston 22 to the desired axial position for fixing the position of the inner rings 7, 8 and/or for setting the desired axial pre-load on the inner rings 7, 8. This will now be further explained.

As is already illustrated in FIG. 3, after the clamping device 2 is pushed onto the shaft 3, the attachment screws 19 are screwed-in through the axial bores 17 of the clamping ring 16 and are tightened in the axial thread bores 20 of the shaft 3. The attachment screws 19 can be screwed-in before or after the axial abutment surface 18 of the clamping ring 16 of the clamping device 2 contacts the axial abutment surface 15 of the shaft 3. The screwing-in of the attachment screws 19 will normally bring the axial abutment surface 18 into contact with the axial abutment surface 15, in case there was not already contact when the clamping device 2 was initially mounted on the shaft 3.

In order to complete the mounting and axial fixing of the inner rings 7, 8, a hydraulic conduit 29 is connected to the inflow opening 27 of the clamping device 2. The hydraulic conduit 29 is connected with a reservoir 31 via a pump 30 and the fluid 26 is stored in a fluid state in the reservoir 31. These components are also illustrated in FIG. 3. The hydraulic conduit 29 may be connected to inflow opening 27 either before or after the clamping device 2 is pushed onto the shaft 3.

After the attachment screws 19 have been tightened, pressurized fluid 26 is supplied by the pump 30 from the reservoir 31 into the hollow chamber 25 of the clamping device 2. The pressurized fluid 26 urges or displaces the piston 22 outwardly from the hollow chamber 25 in the axial direction, so that the piston 22 is axially shifted or displaced until its axial abutment surface 23 abuts on the outer axial end surface 10 of the inner ring 8, if there was not already contact.

The properties of the axial fixing of the tapered roller bearing 1 with the clamping device 2 depend upon the amount of hydraulic pressure that builds up in the hollow chamber 25 due to the pump 30 after the abutment of the piston 22 on the inner ring 8.

If only a very low hydraulic pressure is built up, the piston 22 does not apply any significant force onto the inner ring 8. As a result, the tapered roller bearing 1 will be axially attached by the clamping device 2 without a clearance, but also with any pre-loading or at least without any significant pre-loading.

However, it is also possible to set a defined pre-loading of the tapered roller bearing 1 with the clamping device 2. For this purpose, a higher hydraulic pressure is built up than is necessary for only eliminating the axial bearing clearance. This higher hydraulic pressure causes the piston 22 to be pressed against the inner ring 8 with a corresponding axial force. Due to the thus-resulting axial clamping of the inner rings 7, 8, the inner rings 7, 8 are connected with the shaft 3 so that they rotate together.

In order to achieve a lasting preservation of the clearance-free and/or the pre-loaded axial fixing of the tapered roller bearing 1, the fluid 26 is then caused to solidify in the hollow chamber 25 of the clamping device 2, i.e. it is converted from a fluid state into a solidified state. This solidification process is preferably achieved, e.g., by a chemical reaction, which preferably takes place with a slight time delay after the fluid 26 has been filled into the hollow chamber 25 of the clamping device 2. The time delay is preferably chosen so that, at minimum, an adequate amount of time is provided to build-up the desired hydraulic pressure within the hollow chamber 25 before the fluid 26 solidifies and, at maximum, an unnecessarily long wait time does not result, which would inefficiently slow down the mounting process.

The solidification of the fluid 26 may be initiated intrinsically or by an outside influence, e.g., through temperature, pressure, radiation, etc. A suitable solidification process can be achieved, e.g., by using synthetic monomers as the fluid 26 and by adding a suitable cross-linking agent to the fluid monomers shortly before or during the filling of the fluid 26 into the hollow chamber 25. The cross-linking agent then causes the monomers to polymerize into a solid polymer. For example, liquid epoxy resins can be used with a curing or hardening agent added thereto. In addition, moldable elastomers can also be utilized. Other materials can be utilized instead of synthetic materials, such as e.g. amalgam.

Ideally, the solidification of the fluid 26 does not result in a volume change, or the volume change is so small that the pre-loading of the tapered roller bearing 1 is not unacceptably strongly influenced by the change in volume. However, it also possible to take into consideration a possible volume change of the fluid 26 during the solidification process by appropriately adjusting the amount of hydraulic pressure to be built up in the hollow chamber 25 prior to solidification. In addition, a volume change can be counteracted by transferring fluid 26 into the hollow chamber 25 or out of the hollow chamber 25 as necessary, as long as the consistency of the fluid 26 still permits such fluid transfers. A volume increase can also be counteracted by providing a compensating hollow chamber that is connected to or is in fluid communication with the hollow chamber 25.

After solidification of the fluid 26, the hydraulic conduit 29 is removed from the inflow opening 27 and then the inflow opening 27 may be sealed with a sealing screw 28. As a result, the mounting and the fixing of the tapered roller bearing 1 are completed and the final stage illustrated in FIGS. 1 and 2 is achieved, i.e. the tapered roller bearing 1 is connected with the shaft 3 so that they rotate together and has an axial pre-loading within a desired or pre-determined range.

Figure 4:
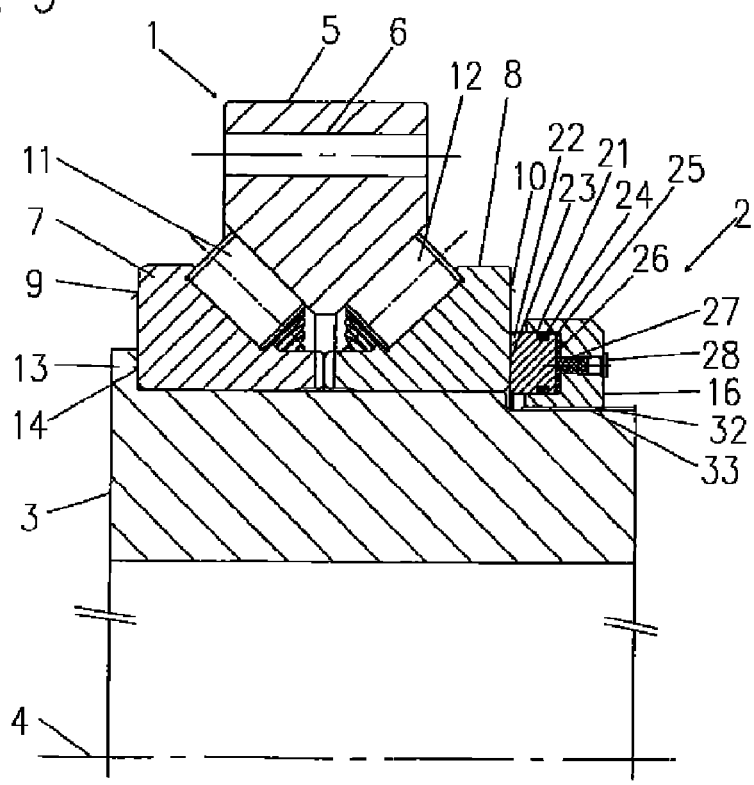
FIG. 4 shows a cross-sectional illustration of a second exemplary embodiment.

FIG. 4 shows a second exemplary embodiment of the bearing assembly in a cross-sectional illustration. The exemplary embodiment illustrated in FIG. 4 corresponds in large part with the exemplary embodiment of FIGS. 1 to 3. However, in contrast to the embodiment of FIGS. 1 to 3, the clamping ring 16 is embodied as a nut having an inner thread 32 in the exemplary embodiment of FIG. 4. Accordingly, the shaft 3 has a complementary outer thread 33 that engages the inner thread 32. The attachment screws 19 and the axial bores 17 of the clamping ring 16, as well as the axial thread bores 20 of the shaft 3, which are illustrated in FIGS. 1 to 3, may be omitted in this embodiment.

The mounting may be performed in a substantially similar manner, as was described for the exemplary embodiment of FIGS. 1 to 3, with the exception that the clamping ring 16 is screwed onto the shaft 3, rather than axially pushed onto the shaft 3. The clamping ring 16 may be rotated, e.g., until it comes into contact with the axial abutment surface 15 of the shaft 3, or a small clearance may remain therebetween. Therefore, the pressurized fluid 25 is supplied into the hollow chamber 26 to achieve the desired axial position and/or desired axial pre-loading of the inner rings 7, 8 relative to the shaft 3.

Reference Number List
   1 tapered roller bearing
   2 clamping device
   3 shaft
   4 rotational axis
   5 outer ring
   6 axial bore
   7 inner ring
   8 inner ring
   9 outer axial end surface
   10 outer axial end surface 11 roller body
12 roller body
13 shoulder
14 axial abutment surface
15 axial abutment surface
16 clamping ring
17 axial bore
18 axial abutment surface
19 attachment screw
20 axial thread bore
21 axial groove
22 piston
23 axial abutment surface
24 sealing ring
25 hollow chamber
26 fluid
27 inflow opening
28 sealing screw
29 hydraulic conduit
30 pump
31 reservoir
32 inner thread
33 outer thread

The invention claimed is:

1. A method for permanently fixing an axial position of a first machine element relative to a second machine element, comprising:
applying a pressurized fluid into a sealed hollow chamber having a shape of an annular ring formed between an annular shaped piston and an axial groove formed within a clamping ring, the annular shaped piston being located to engage with a outer axial end surface of the first machine element, wherein the pressurized fluid applies an evenly distributed pressure about the annular shaped piston to temporarily fix the first machine element in a pre-determined axial position relative to the second machine element, wherein an axial motion limiting feature of the second machine element restrains an axial motion of the first machine element against the force applied by the annular shaped piston; and
solidifying the fluid to permanently fix the axial position of the first machine element relative to the second machine element.

2. The method of claim 1, wherein the applying step further comprises applying the pressurized fluid until a pre-determined axial pre-load on the first machine element is reached and then solidifying the fluid so as to permanently maintain the axial pre-load on the first machine element.

3. The method of claim 2, wherein the applying step further comprises displacing the axial abutment surface in the axial direction in order to compensate for a size tolerance.

4. The method of claim 3, wherein the axial abutment surface is defined on an axially-displaceable piston of a clamp and the pressurized fluid is applied to a surface of the piston that is axially opposite of the axial abutment surface.

5. The method of claim 4, wherein the piston is movably disposed in a hollow chamber of the clamp and the applying step further comprises supplying the pressurized fluid into the hollow chamber, wherein the piston is displaced outwardly from the hollow chamber in the axial direction.

6. The method of claim 5, further comprising rigidly affixing the clamp to the second machine element prior to the applying step.

7. The method of claim 6, wherein the fluid is caused to solidify by a polymerization reaction.

8. The method of claim 7, wherein:
the first machine element is a bearing ring;
the second machine element is a shaft; and
the axially-displaceable piston is ring-shaped and is disposed concentrically around the shaft.

9. The method of claim 8, wherein the first machine element is the bearing ring of a wind turbine and the second machine element is a rotor shaft of the wind turbine.

10. The method of claim 1, wherein the axial abutment surface is defined on an axially-displaceable piston of a clamp, the piston is movably disposed in a hollow chamber of the clamp and the applying step further comprises supplying the pressurized fluid into the hollow chamber against a surface of the piston that is axially opposite of the axial abutment surface, wherein the piston is displaced outwardly from the hollow chamber in the axial direction.

11. The method of claim 1, wherein the fluid is caused to solidify by a polymerization reaction.

12. The method of claim 1, wherein the fluid comprises at least one of an epoxy and an elastomer.

13. The method of claim 1, wherein:
the first machine element is a bearing ring;
the second machine element is a shaft; and
the axially-displaceable piston is ring-shaped and is disposed concentrically around the shaft.

* * * * *